(12) United States Patent
Benschop et al.

(10) Patent No.: US 8,443,424 B2
(45) Date of Patent: May 14, 2013

(54) METHOD AND SYSTEM FOR REDUCING THE PROLIFERATION OF ELECTRONIC MESSAGES

(75) Inventors: Dirk Leonard Benschop, Etten-Leur (NL); Henderik Reinout Benschop, Rozenburg (NL)

(73) Assignee: Scipioo Holding B.V., Etten-Leur (NL)

( * ) Notice: Subject to any disclaimer, the term of this patent is extended or adjusted under 35 U.S.C. 154(b) by 990 days.

(21) Appl. No.: 11/983,799

(22) Filed: Nov. 9, 2007

(65) Prior Publication Data

US 2008/0196092 A1      Aug. 14, 2008

Related U.S. Application Data

(63) Continuation-in-part of application No. PCT/NL2007/000224, filed on Sep. 11, 2007.

(30) Foreign Application Priority Data

Feb. 8, 2007 (NL) ...................................... 1033356

(51) Int. Cl.
*G06F 21/00* (2006.01)

(52) U.S. Cl.
USPC ............................................................ 726/5

(58) Field of Classification Search ........................ 726/5
See application file for complete search history.

(56) References Cited

U.S. PATENT DOCUMENTS

| | | | |
|---|---|---|---|
| 5,475,819 A | 12/1995 | Miller | |
| 5,870,473 A | 2/1999 | Boesch | |
| 6,298,383 B1 | 10/2001 | Gutman et al. | |
| 6,453,327 B1 | 9/2002 | Nielsen | |
| 6,457,060 B1 | 9/2002 | Martin | |
| 6,529,943 B1 | 3/2003 | Ohi | |
| 6,615,231 B1 | 9/2003 | Deen et al. | |
| 6,718,389 B2 | 4/2004 | Navarre et al. | |
| 6,889,325 B1 | 5/2005 | Sipman | |
| 6,952,769 B1 | 10/2005 | Dubey | |
| 7,035,634 B2 * | 4/2006 | Mead et al. | 455/431 |
| 7,155,001 B2 | 12/2006 | Tiliks et al. | 379/196 |
| 7,500,108 B2 | 3/2009 | Johnson et al. | |
| 7,523,164 B2 | 4/2009 | Kantor et al. | |
| 7,711,779 B2 | 5/2010 | Goodman et al. | |

(Continued)

FOREIGN PATENT DOCUMENTS

| | | |
|---|---|---|
| EP | 0479660 A | 4/1992 |
| EP | 0813162 | 12/1997 |

(Continued)

OTHER PUBLICATIONS

Advisory Action mailed Sep. 8, 2010 for U.S. Appl. No. 11/983,798, filed Nov. 9, 2007, pp. 1-3.

(Continued)

*Primary Examiner* — Brandon Hoffman
*Assistant Examiner* — Anthony Brown
(74) *Attorney, Agent, or Firm* — De Vries & Metman

(57) ABSTRACT

A method and system for reducing the proliferation of electronic messages is disclosed. An electronic message or a portion thereof is transmitted by the server system. A spam notification signal may be received related to the electronic message or the portion thereof. Access to said electronic message is restricted solely in response to receiving the spam notification signal.

36 Claims, 5 Drawing Sheets

U.S. PATENT DOCUMENTS

| | | | |
|---|---|---|---|
| 7,840,206 B2 | 11/2010 | Kaechi | 455/411 |
| 2001/0026609 A1 | 10/2001 | Weinstein et al. | 379/93.01 |
| 2001/0036822 A1 | 11/2001 | Mead | |
| 2002/0095488 A1 | 7/2002 | Primak | |
| 2002/0156728 A1 | 10/2002 | Jaschhof et al. | |
| 2002/0174194 A1 | 11/2002 | Mooney et al. | |
| 2003/0018721 A1 | 1/2003 | Gupta | |
| 2003/0023873 A1 | 1/2003 | Ben-Itzhak | |
| 2003/0026396 A1 | 2/2003 | Weik | |
| 2003/0112948 A1 | 6/2003 | Brown et al. | |
| 2003/0154165 A1 | 8/2003 | Horn | |
| 2003/0172159 A1 | 9/2003 | Schuba et al. | |
| 2003/0204719 A1 | 10/2003 | Ben-Itzhak | |
| 2003/0233318 A1 | 12/2003 | King et al. | |
| 2004/0019651 A1 | 1/2004 | Andaker | |
| 2004/0176072 A1* | 9/2004 | Gellens | 455/412.1 |
| 2004/0205135 A1 | 10/2004 | Hallam-Baker | |
| 2004/0213396 A1 | 10/2004 | MacNamara et al. | |
| 2005/0021649 A1 | 1/2005 | Goodman | |
| 2005/0081051 A1 | 4/2005 | Girouard | |
| 2005/0111648 A1 | 5/2005 | Roome | |
| 2005/0249214 A1 | 11/2005 | Peng | |
| 2005/0273857 A1 | 12/2005 | Freund | |
| 2006/0020692 A1 | 1/2006 | Jaffray | |
| 2006/0168024 A1 | 7/2006 | Mehr et al. | |
| 2006/0187901 A1 | 8/2006 | Cortes et al. | |
| 2006/0224681 A1 | 10/2006 | Wurster | |
| 2006/0239190 A1 | 10/2006 | Kumar et al. | |
| 2006/0253597 A1 | 11/2006 | Mujica | |
| 2006/0265325 A1 | 11/2006 | Fajardo | |
| 2007/0005716 A1* | 1/2007 | LeVasseur et al. | 709/206 |
| 2007/0078929 A1 | 4/2007 | Beverly | |
| 2007/0106734 A1 | 5/2007 | Mahajan et al. | |
| 2007/0124226 A1 | 5/2007 | Garner, Jr. | |
| 2007/0180039 A1 | 8/2007 | Sutidze | |
| 2008/0052324 A1 | 2/2008 | Choubey | |
| 2008/0107101 A1 | 5/2008 | Liu | 370/352 |
| 2008/0137828 A1 | 6/2008 | Chmaytelli | 379/142.01 |
| 2008/0147837 A1 | 6/2008 | Klein et al. | |
| 2008/0192918 A1 | 8/2008 | Benschop | |
| 2008/0194234 A1 | 8/2008 | Benschop | |
| 2008/0195515 A1 | 8/2008 | Benschop | |
| 2008/0195713 A1 | 8/2008 | Benschop | |
| 2008/0196093 A1 | 8/2008 | Benschop | |
| 2008/0196094 A1 | 8/2008 | Benschop | |
| 2009/0012878 A1 | 1/2009 | Tedesco | |
| 2009/0158403 A1 | 6/2009 | Benschop | |
| 2009/0171821 A1 | 7/2009 | Denker et al. | |
| 2009/0178117 A1 | 7/2009 | Benschop | |
| 2009/0187666 A1 | 7/2009 | Benschop | |

FOREIGN PATENT DOCUMENTS

| | | |
|---|---|---|
| EP | 0813162 A | 12/1997 |
| EP | 1180748 A | 2/2002 |
| EP | 1180756 A | 2/2002 |
| EP | 1282087 | 2/2003 |
| EP | 1457912 | 9/2004 |
| EP | 1496655 A | 1/2005 |
| JP | A10-074172 | 3/1998 |
| JP | A2003348162 | 5/2003 |
| JP | A2003-163696 | 6/2003 |
| JP | A2006-311607 | 11/2006 |
| NL | 1022704 C2 | 8/2004 |
| WO | WO 98/42173 | 10/1998 |
| WO | WO 00/42748 A | 7/2000 |
| WO | WO 01/72002 | 9/2001 |
| WO | WO0172002 | 9/2001 |
| WO | WO02/075547 | 9/2002 |
| WO | WO 02/075547 | 9/2002 |
| WO | WO 03/003234 A | 1/2003 |
| WO | WO 03061213 A | 7/2003 |
| WO | WO 2004/036855 | 4/2004 |
| WO | WO2004036855 | 4/2004 |
| WO | WO 2004/071035 | 8/2004 |
| WO | WO 2004/075086 A | 9/2004 |
| WO | WO 2004/088455 A | 10/2004 |
| WO | WO 2005124621 | 12/2005 |

OTHER PUBLICATIONS

Final Office Action mailed Jun. 29, 2010 for U.S. Appl. No. 11/983,798, filed Nov. 9, 2007, pp. 1-24.

Office Action mailed Oct. 28, 2009 for U.S. Appl. No. 11/983,798, filed Nov. 9, 2007, pp. 1-21.

Benschop, Office Action mail date Mar. 25, 2011 for U.S. Appl. No. 11/983,802, filed Nov. 9, 2007, pp. 1-14.

Official Extended Search Report of the European Patent Office in counterpart foreign application No. PCT/NL2007/000224 filed Sep. 11, 2007.

Official Search Report of the European Patent Office in counterpart foreign application No. PCT/NL2007/050557 filed Sep. 11, 2007.

Sandhu R.S. et al: Access Control: Principles and Practice, IEEE Communicationas Magazine, vol. 32, No. 9, Sep. 1, 1994, pp. 40-48.

Office Action mailed Oct. 18, 2011 for U.S. Appl. No. 11/983,802, filed Nov. 9, 2007, pp. 1-14.

Benschop, Office Action mail date Jul. 20, 2011 for U.S. Appl. No. 11/983,798, filed Nov. 9, 2007, pp. 1-14.

Japanese Patent Office Action, Notice of Reasons for Rejection, mailed Jun. 19, 2012 for Japanese Application No. 2009-549019, filed Nov. 9, 2007.

Final Office Action mailed Jan. 27, 2012 for U.S. Appl. No. 11/983,798, filed Nov. 9, 2007, pp. 1-15.

Advisory Action mailed Jan. 18, 2012 for U.S. Appl. No. 11/983,802, filed Nov. 9, 2007, pp. 1-3.

Office Action mailed Apr. 23, 2012 for U.S. Appl. No. 12/015,862, filed Jan. 17, 2008, 27 pages.

* cited by examiner

METHOD AND SYSTEM FOR REDUCING THE PROLIFERATION OF ELECTRONIC MESSAGES

CROSS-REFERENCE TO RELATED APPLICATION

The present application is a continuation-in-part of and claims priority of International patent application Ser. No. PCT/NL2007/000224, filed Sep. 11, 2007, and published in English the content of which is hereby incorporated by reference in its entirety.

BACKGROUND

The discussion below is merely provided for general background information and is not intended to be used as an aid in determining the scope of the claimed subject matter. Aspects of the invention relate to a method and system for reducing the proliferation of electronic messages. More specifically, aspects relate to a method and system for reducing the proliferation of unsolicited electronic messages in a server system comprising one or more servers for distributing said electronic messages and at least a first user device and a second user device arranged for receiving said electronic messages from said server system.

E-mail spam may generally be defined as unsolicited and/or undesired e-mail messages received by an e-mail recipient.

The amount of e-mail spam messages has dramatically increased over the last decade. The reason for that may be found in the huge number of addressees that can be reached with an e-mail at negligible costs. This combination of factors together with the obligatory delivery of e-mail has made e-mail or, more generally, electronic messaging an attractive communication medium for advertisement of a variety of products and services. Collections of e-mail addresses of people all over the world can be bought from numerous parties at very low cost. E-mail spam messages now account for more than 90% of all e-mail messages transmitted over the internet. As a consequence, electronic resources are wasted to a serious extent.

The increase of the amount of e-mail spam messages has triggered others to provide e-mail spam filters. These filters can be installed both on the side of the server and on the side of the client devices to detect and delete e-mail spam messages without troubling the user. Typically, these filters analyse e-mail messages and match the analysis results against e-mail spam rules in order to recognize e-mail spam. These e-mail spam rules are designed on the basis of known typical characteristics of e-mail spam messages, such as the number of addressees in the e-mail header or the occurrence of certain words in the e-mail body.

However, new forms of spam will not always be recognized and intercepted by these filters, since the e-mail spam rules are not able to recognize these new forms of spam since these spam rules for the new form of e-mail spam message could not yet have been implemented in the spam filter. As a consequence, a continuous race exists between e-mail spammers and spam filter providers, the latter by definition lagging behind the former. On the other hand, solicited and desired e-mail messages are sometimes filtered from the e-mail box of a recipient, because the e-mail message is qualified as spam as dictated by the e-mail spam rule set of the spam filter.

Furthermore, if e-mail spam filters are installed, the filters analyze each individual e-mail message in order to detect e-mail spam messages. As a consequence, message transfer is delayed and resources are wasted.

US 2007/0106734 discloses a system comprising a server and a method for limiting proliferation of unwanted electronic messages. The server can receive a notification from a first user identifying a first electronic message as spam and compare parameters associated with the first electronic message against spam criteria. Responsive to the parameters meeting the spam criteria, other instances of the first electronic message can be blocked from being sent to other users and a credit notification for an account of the first user can be generated. A second user from whom the spam originated can be added to a blocked sender list of the first user. Responsive to identifying a second electronic message generated from the first user to the second user, a correction charge notification can be generated for the account of the first user.

The system and method of US 2007/0106734 require the use of a spam filter and matching spam parameters against spam criteria. Only when spam parameters are identified, users may send spam notifications and other instances may be blocked.

It will be apparent that there is a need in the art for an improved or different method and system for reducing the proliferation of electronic messages, in particular e-mail spam messages.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

A method of reducing the proliferation of electronic messages is proposed in a server system comprising one or more servers for distributing the electronic messages. The method involves providing at least one electronic message or a portion thereof and receiving at least one spam notification signal related to said electronic message or said portion thereof. A portion of an electronic message may e.g. comprise one or more fields of the electronic message or a new portion assembled on the basis of fields or characteristics of the electronic message. Access to the electronic message (and/or the portion thereof) and/or to other (previous or future) electronic messages of the same source is restricted in response to receiving said at least one spam notification signal. The number of spam notification signals resulting in the restriction of access to the electronic message may be set. As an example, the number may be set to 50, 25, 10, 5 or even 1 spam notification signal before access to the electronic message is restricted.

In particular, the server system may be arranged to connect to at least a first user device and a second user device arranged for receiving electronic messages from the server system. The method involves providing at least one electronic message from the server system to the first user device. Alternatively, only a portion of the electronic message is transmitted to the first user device. The server system subsequently receives a spam notification signal from the first user device related to the electronic message or the portion thereof if the electronic message is identified by the user of the first user device as being a spam message. In response to receiving the spam notification signal from the first user device, the server system restricts access to the electronic message and/or the portion thereof and/or other electronic messages from the same source for the second user device or a user.

The applicant also proposes a computer program and a carrier (e.g. computer readable media) containing such a computer program, wherein the computer program contains software code portions or instructions capable of, when installed in and executed by an electronic device, performing the method described in the previous paragraph.

Also, a server system is proposed comprising one or more servers adapted for reducing the proliferation of electronic messages. The server system comprises an electronic message receiver arranged for receiving an electronic message or a portion thereof and an electronic message provider arranged for providing said electronic message or said portion thereof. A spam notification receiver arranged for receiving at least one spam notification signal related to said electronic message or said portion thereof is provided. The server system comprises an access restrictor arranged for restricting access to said electronic message (and/or the portion thereof) and/or other (previous or future) electronic messages from the same source in response to receiving said at least one spam notification signal.

In particular, the server system is arranged for communicating with at least a first and a second user device via a network. The electronic message provider is arranged for providing said electronic message or said portion thereof to said first user device. The spam notification receiver is arranged for receiving a spam notification signal from said first user device. The access restrictor is arranged for restricting access to said electronic message (and/or the portion thereof) and/or other (previous or future) electronic messages from the same source for said second user device or a user in response to receiving said spam notification signal from said first user device.

It should be noted that access to the electronic message, the portion thereof or other previous or future electronic messages may be restricted for a user device and/or the user of the user device, the latter option making use of e.g. identification data of the user.

It should also be appreciated that the server system does not necessarily refer to a client-server system. Aspects of the invention may also be applicable in peer-to-peer networks, such as e.g. used for bittorrent applications, wherein a server or (some) server functionality may be considered to be part of one or more of the user devices participating in the peer-to-peer network. The spam notification signal may then e.g. be broadcast over the peer-to-peer network from one user device to others.

The method and system may be embodied as a web application.

The applicant has realized that the employment of prior art e-mail spam filters is dissatisfactory. The rule set used for recognizing e-mail spam messages is always outdated, despite the regular updates of the rule set provided by the spam filter developers. Ultimately, only human beings will be able to recognize e-mail spam messages. Moreover, the applicant has realized that the improvement of spam filters contributes to the increase of the total amount of spam rather than reducing it. The applicant, therefore, proposes to use (in one embodiment solely to use) spam notification signals from users to detect electronic spam messages and, upon receipt of such a spam notification signal, to restrict access to the corresponding electronic message for other (users of) user devices. The server system thus allows that addressees of an electronic message themselves determine what electronic messages are spam messages and that the addressees are subsequently able to determine the access (rights) of other addressees to that message (and possibly other previous and/or future electronic messages from the same source). In other words, the spam notification signal is an order to the server system to restrict access to messages. In case of multiple spam notification signals, each signal can be regarded as a partial order. As an example, the other (users of) user devices may not display or download the electronic message. Spam filters using spam recognition rule sets, spam parameters and criteria may be absent in the server system, at least for those electronic messages for which a spam notification signal has been received.

Some embodiments provide the advantage of establishing a subscriber-only system for electronic message distribution. Since the subscribers are known, e-mail spammers and other abusers of the system can be identified and excluded from participation as a subscriber to the system. Moreover, this embodiment allows identification of users of the server system to exclude users from the system.

Some embodiments prevent the possibility of sniffing the identity of participants to the system and to subsequently participate in the server system under a false identity. Secure communication may be realized by one or more known techniques, such as encrypting data or providing secure network connections.

Conventional e-mail servers duplicate e-mail messages for each addressee. The duplicated e-mail messages are each analyzed by the conventional spam filters. Some embodiments provide the advantage of limited use of resources. The embodiments also facilitate access restriction to the electronic message. In these embodiments, only small portions (e.g. less than 200 bytes or 100 bytes) characterizing the original electronic message are made available to the addressees. These portions may e.g. include a sender identification, a subject of the electronic message, a date of the electronic message and/or a retrieval key containing information where and/or how to retrieve the complete electronic message. The portions of the electronic message may either be pushed to the servers of the server system or be queried from a particular server of the server system, if needed. Thus, resource consuming processing and network capacity requirements are reduced considerably. Reference is made to a co-pending international patent application of the applicant ("method and system for transmitting an electronic message") filed on the same date as the present application, the contents of the international application being incorporated in the present application by reference in its entirety.

Some embodiments provide the advantage of enabling users to restrict access to other previous and/or future electronic messages from the same source on the basis of a sender identification of an electronic message for which a spam notification signal was received. Provisions can be made to mitigate the severity of such a measure for the sender on the basis of various parameters, such as the number of offences of the sender. In particular, the applicant proposes to restrict access to other electronic messages for addressees of the electronic message for which the at least one spam notification signal was received in dependence of a communication history between said sender and said one or more addressees from which a spam notification signal was received. As an example, access restriction to other electronic messages may be performed immediately if the sender is unknown to the recipient (e.g. if the sender and recipient have not exchanged electronic messages previously). However, if the sender and recipient know each other, access to other electronic messages is not restricted at once (but possibly only after several spam notification signals have been received for different electronic messages).

Some embodiments allow for not troubling each user of a user device with the electronic spam message and/or the transmitted portion thereof for which he was an addressee.

Some embodiments provide the possibility of the server system sending a warning signal to the sender of the electronic message for which a spam notification signal was received. This allows for providing the sender with information concerning the consequences of further offences. The consequence of restricting access to the server system can be obtained by some embodiments. The consequence of no longer giving access to the server system may be mitigated. In particular, the applicant proposes to restrict access to the server system for senders of the electronic message for which the at least one spam notification signal was received in dependence of a communication history between said sender and one or more addressees from which a spam notification signal was received. As an example, access restriction to the server system may be performed immediately if the sender is unknown to a recipient (e.g. if the sender and recipient have not exchanged electronic messages previously) and the recipient issues a spam notification signal. However, if the sender and recipient know each other, access to the server system is not restricted immediately in response to a spam notification signal issued from the user device of a known recipient (but possibly only after spam notification signals have been received for different electronic messages). Reference is made to a co-pending international patent application of the applicant ("Method and system for restricting access to an electronic message system") filed on the same date as the present application, the contents of the international application being incorporated in the present application by reference in its entirety.

Of course, the server system may employ spam filters in addition to the functionality described in the present application for reducing the proliferation of electronic message. However, the server system as defined above operates independently from the operation of these possible spam filters.

Some embodiments allow for the approval for exchange of electronic messages in advance. The approval module may be combined with a mandatory address book that the users should use for indicating addressees of an electronic message.

In an embodiment of the invention, the server system would not comprise an e-mail server. E-mail servers typically only store electronic messages and forward the messages upon request. An exemplary server system proposes to use programmable databases. Programmable databases allow to program predetermined responses in dependence on the type of request received. For spam notification, the users are allowed to perform an operation (requests) on a database, wherein the response of the database is e.g. the restriction of access for other addressees of the electronic message, the restriction of access to other electronic messages of the same source and/or the exclusion of the sender from the system. Moreover, such a programmable database allows for monitoring relations between several parameters.

The applicant also proposes a user device comprising software code portions and a computer program comprising these software code portions for engaging in one or more steps of the above described method and/or to communicate with the above-described server system.

The applicant also proposes a communication system for exchanging electronic message comprising a server system and the first and second user devices.

The applicant further proposes an information exchange system.

It should be noted that the above-embodiments, or aspects thereof, may be combined or isolated. As an example, the method and server system may also allow access restriction for other previous or future electronic messages only, i.e. without restricting access to the particular electronic message for which the one or more spam notification signals were received.

Hereinafter, embodiments of the invention will be described in further detail. It should be appreciated, however, that these embodiments may not be construed as limiting the scope of protection for the present invention.

DETAILED DESCRIPTION OF THE ILLUSTRATIVE EMBODIMENT

Figure 2:
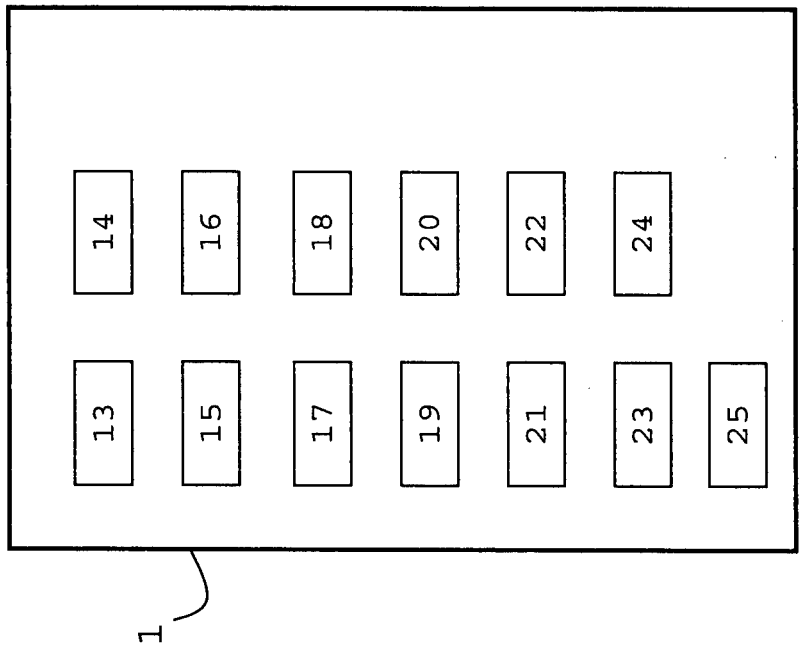
FIG. 2 shows a schematic example of a server system.
Figure 1:
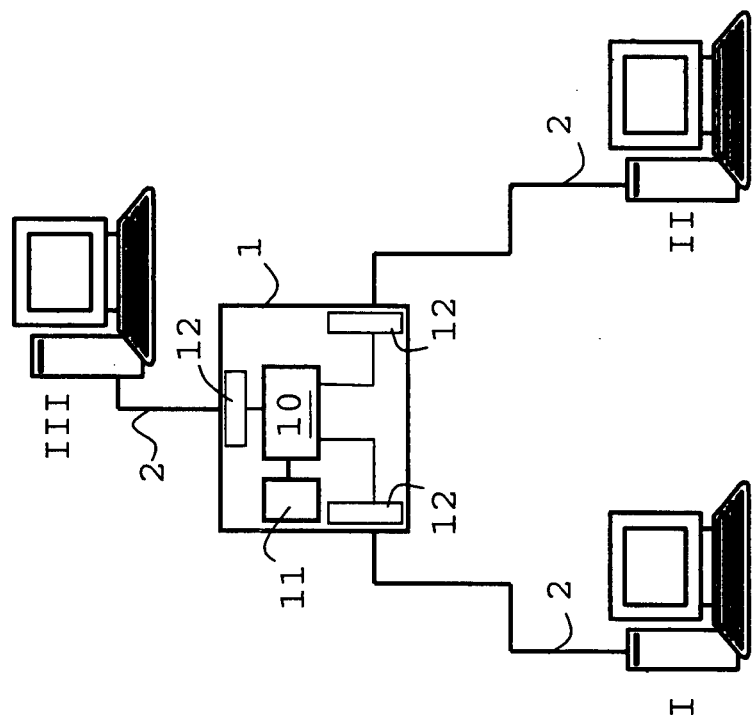
FIG. 1 shows a schematic example of a communication system for exchanging electronic messages.

FIGS. 1 and 2 show a server system 1 according to an embodiment of the invention. The server system 1 is connected to a first user device I, a second user device II and a third user device III via network connections 2. The network connections 2 may involve multiple networks, both wired and wireless, and the connection of the user devices I, II, III is not necessarily direct to the server system 1.

The first, second and third user devices I, II, III are arranged for sending and receiving electronic messages, such as e-mail messages, and may be personal computers, mobile communication devices etc.

The server system 1 comprises a processor 10, a memory 11 and a network adapter 12 for communicating with the first, second and third user devices I, II, III. It should be appreciated that the server system 1 is normally capable of connecting to more than the three user devices I, II and III shown in FIG. 1.

The specific functions of the server system 1 are schematically illustrated in FIG. 2 and will now be described in further detail. It should be appreciated that the functions may be largely implemented as software code portions of one or more computer programs executed by the processor 10.

The server system 1 is arranged to receive an electronic message from the third user device III.

The server system 1 comprises an electronic message receiver 13 arranged for receiving an electronic message or a portion thereof and an electronic message provider 14 arranged for providing said electronic message or said portion thereof to the first user device I. The server system 1 also contains a spam notification receiver 15 arranged for receiving a spam notification signal from the first user device I related to the electronic message or the portion thereof. Also, the server system 1 comprises an access restrictor 16 arranged for restricting access to the electronic message for the (user of) the second user device II solely in response to receiving said spam notification signal from said first user device.

The server system 1 has a register 17 storing a unique login code comprising a user name and a user specific password required for accessing the server system 1 for each user of the user devices I, II and III.

Communication over the network connections 2 is secured. To that end, the server system 1 contains an encryptor 18 for encrypting part or all communications between the server system 1 and the first, second and third user devices I, II, and III. It is noted that alternatively, or in addition thereto, the network connections 2 may be secured. Secure communication prevents or reduces the possibility of sniffing identities of (the users of) the first, second and third user device I, II and III.

The server system 1 may be arranged to make a copy of the electronic message for both the first user device I and the second user device II. However, it may also be that the server system 1 only stores a single copy of the electronic message received from the third user device III.

The server system 1 has an electronic mail deleter 19 for deleting the electronic mail and the copies and/or portions thereof, if any, in response to the spam notification signal from the first user device I.

Furthermore, the server system 1 has a sender identification storage 20 arranged for storing a sender identification of a sender of the electronic message for which the spam notification signal receiver 15 received a spam notification signal, i.e. the identification of the user of the third user device III. If other electronic messages are received or have been received in the past from this user, the access restrictor 16 may use the sender identification to restrict access to these other electronic messages for the second user device II automatically, i.e. without requiring a further spam notification signal for these other electronic messages. Of course, access restrictions may apply also for the (user of the) first user device.

The access restrictor 16 may be arranged such that e.g. access is restricted for the (user of the) second user device II for a particular time period or to a part of the other electronic messages. However, the access restrictor 16 may also prevent downloading of the electronic message to said second user device or prevent display of the electronic message on the second user device II.

In particular, a communication history between a sender and the recipient from which a spam notification signal was received may be taken into account. For example, if the users of the third user device III and the first user device I have not been engaged in electronic message exchange before (i.e. the users don't 'know' each other), the receiving of the spam notification signal may immediately result in preventing other addressees from downloading or displaying other past and future electronic messages. However, if the user of the third user device III and the first user device I have been involved in electronic message exchange in the past (i.e. the users 'know' each other), consequences of the spam notification signal may be less severe. Another example of users 'knowing' each other may be that each of the users have indicated prior to exchange of electronic message that they will accept electronic messages from each other.

The server system 1 may contain a counter 21 adapted for counting the number of spam notification signals received for electronic messages of a particular sender and/or for counting the number of times access has been restricted for electronic messages of said sender.

The server system 1 comprises a warning message transmitter 22 adapted for sending a warning message to a sender of the electronic message for which said spam notification signal was received from the first user device I.

The server system 1 also comprises an access restrictor 23 adapted to restrict access to the server system 1 for a sender of the electronic message for which said spam notification signal was received, i.e. the sender using the third electronic device III. Restriction of the access may involve excluding the user of the third device III from further sending and/or receiving electronic messages via the server system 1. However, the server system 1 may comprise an assessor module 24 arranged to restrict access to the server system in dependence on e.g. the number of spam notification signals received for electronic messages of the sender and/or the number of times access has been restricted for electronic messages of the sender.

In particular, a communication history between a sender and the recipient from which a spam notification signal was received may be taken into account. For example, if the users of the third user device III and the first user device I have not been engaged in electronic message exchange before (i.e. the users don't 'know' each other), the receiving of the spam notification signal may immediately result in preventing access to the server system 1 for the sender. However, if the user of the third user device III and the first user device I have been involved in electronic message exchange in the past (i.e. the users 'know' each other), consequences of the spam notification signal may be less severe for the user of the third user device III. Another example of users 'knowing' each other may be that each of the users have indicated prior to exchange of electronic message that they will accept electronic messages from each other.

It should be noted that the server system 1 may contain a spam filter using a spam rule set, spam parameters and spam criteria for detecting, and possibly restrict access to, electronic spam messages. The server system 1, however, is capable of restricting access to the server system for the (user of the) second device II and/or the sender of the electronic spam message independent from the operation of the spam filter, i.e. solely on the basis of spam notification signals.

Finally, the server system 1 contains an approval module 25 adapted to allow exchange of electronic messages between a sender, e.g. the user of the third user device III, and an addressee, e.g. the user of the first user device I, only if both the sender and the addressee have signaled approval for said exchange to the access module 25 in advance. The computer program running on the user devices I and III for sending and receiving electronic messages may e.g. comprise a mandatory address book under the control of the approval module 25. Only by using this address book, a sender may address addressees of the electronic message. Entries in the address book can be made only in response to mutual approval of users to exchange electronic messages.

Figure 3:
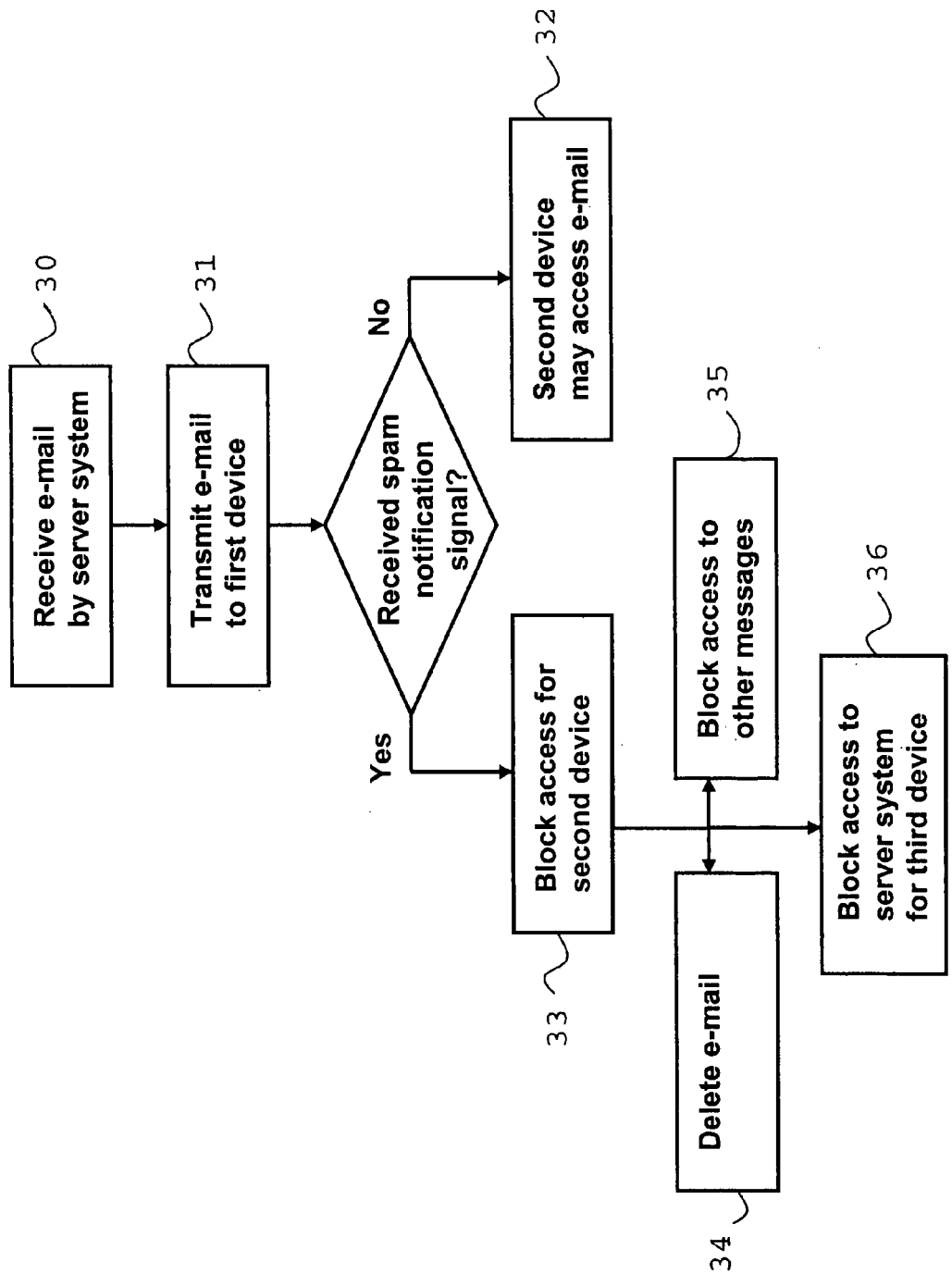
FIG. 3 shows a flow chart depicting steps of a method for reducing the proliferation of electronic messages for the communication system of FIG. 1.

FIG. 3 illustrates a flow chart containing a few steps of the operation of the server system 1 according to an embodiment of the invention.

In a first step 30, the electronic message receiver 13 of the server system 1 receives an electronic message from the third user device III over a secure network connection 2 directed to, amongst others, the users of user devices I and II. The electronic message provider 14 of the server system 1 provides the electronic message to the first user device I in step 31.

If the first reader, e.g. the user of the first user device I, accepts the electronic message as a desired message, a spam notification signal will not be received by the server system 1 in relation to that electronic message. Consequently, the user of the second user device II may also access the electronic message, indicated in step 32.

If the user of the first user device I qualifies the contents of the electronic message as spam, he may transmit a spam notification signal relating to the electronic spam message to the server system 1. The user of the first user device I may e.g. send a spam notification signal by activating a dedicated button on a user interface of the first user device I. The spam notification signal is detected by the spam notification signal receiver 15 of the server system 1. In response to receiving the spam notification response signal, the access restrictor 16 restricts access for (a user of) the second user device II to the electronic message, indicated by step 33. The e-mail deleter 19 of the server system 1 may e.g. delete the electronic spam message for which the spam notification signal was received (step 34).

Preferably, the user of the third user device III distributing the electronic spam message is known to the server system 1, e.g. by having stored in register 17 a unique login code comprising a user name and a user specific password required for accessing the server system 1. Using these data, the sender identification storage has stored the identity of the sender of the electronic spam message. If an other electronic message is sent (not necessarily an electronic spam message) or has been sent previously, it is determined that for this sender a previous spam notification signal has already been received. Access to these other messages of the sender may therefore be denied as well. Consequently, neither the first user device I nor the second user device II will have access to these other electronic messages (step 35). As such a measure may be rather harsh on the sender of the previous electronic spam message, consequences may be mitigated by allowing the access restrictor 16 to restrict access for the (user of the) second user device II for a particular time period and/or to only a part of the other electronic messages. The assessor module 24 may be used for this purpose. In particular, if the sender and recipient have exchanged electronic messages before, access restriction to other electronic messages may be only performed after a certain number of spam notification signals from a recipient, using counter 21.

Finally, in step 36, the access restrictor 23 restricts access to the server system 1 for (the user of) the third user device III for which the spam notification signal was received. Restriction of the access may involve exempting the user of the third device III from further sending and/or receiving of electronic messages via the server system 1. Again, as such a measure may be harsh on the user of the third user device III, the assessor module 24 may restrict access to the server system 1 in dependence on e.g. the number of spam notification signals received for electronic messages of the sender and/or the number of times access has been restricted for electronic messages of the sender. In particular, if the sender and recipient have exchanged electronic messages before, access restriction to the server system may be only performed after a certain number of spam notification signals from a recipient, using counter 21.

It should be appreciated that, while in the above example a single spam notification signal was sufficient to exclude other addressees from receiving (other) electronic messages and to exclude a sender from participation in the system, another number of spam notification signals may be set before such consequences will apply.

Figure 4:
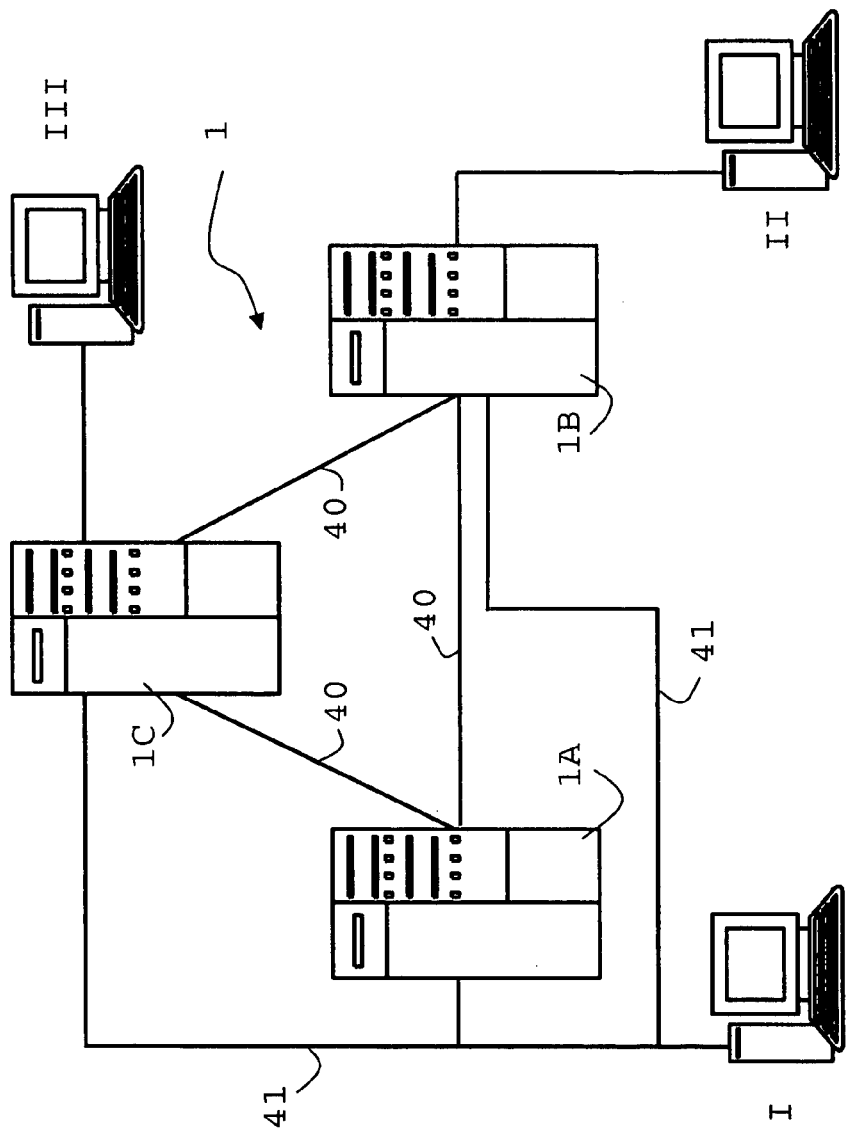
FIG. 4 illustrates another example of a communication system for exchanging electronic messages.

In the system of FIG. 1, the server system 1 comprises a single server. However, the server system 1 may also comprise several servers 1A, 1B, 1C in communicative connection with each other as illustrated in FIG. 4. That is, the servers 1A, 1B and 1C together form a server system 1. The connections 40 connecting the servers 1A, 1B and 1C constitute an inner ring. The first, second and third user devices I, II and III may connect to different servers 1A, 1B and 1C of this inner ring, as shown in FIG. 4, either directly or via further servers (not shown). Each of the first, second and third user devices I, II and III may also access the servers 1B and 1C; 1A and 1C and 1A and 1B, respectively without using the inner ring formed by the connections 40. In FIG. 4, this outer ring, formed by connections 41, is only drawn for the first user device I.

Communication may be secured in both the inner ring and the outer ring. This may be done by encrypting communication over the inner ring and outer ring and/or by making use of secure connections.

Each server 1A, 1B, 1C of the server system 1 may contain the same functional modules 13-25 as described with reference to FIG. 2. However, the functional modules may also be distributed over the various servers 1A, 1B and 1C.

Figure 5:
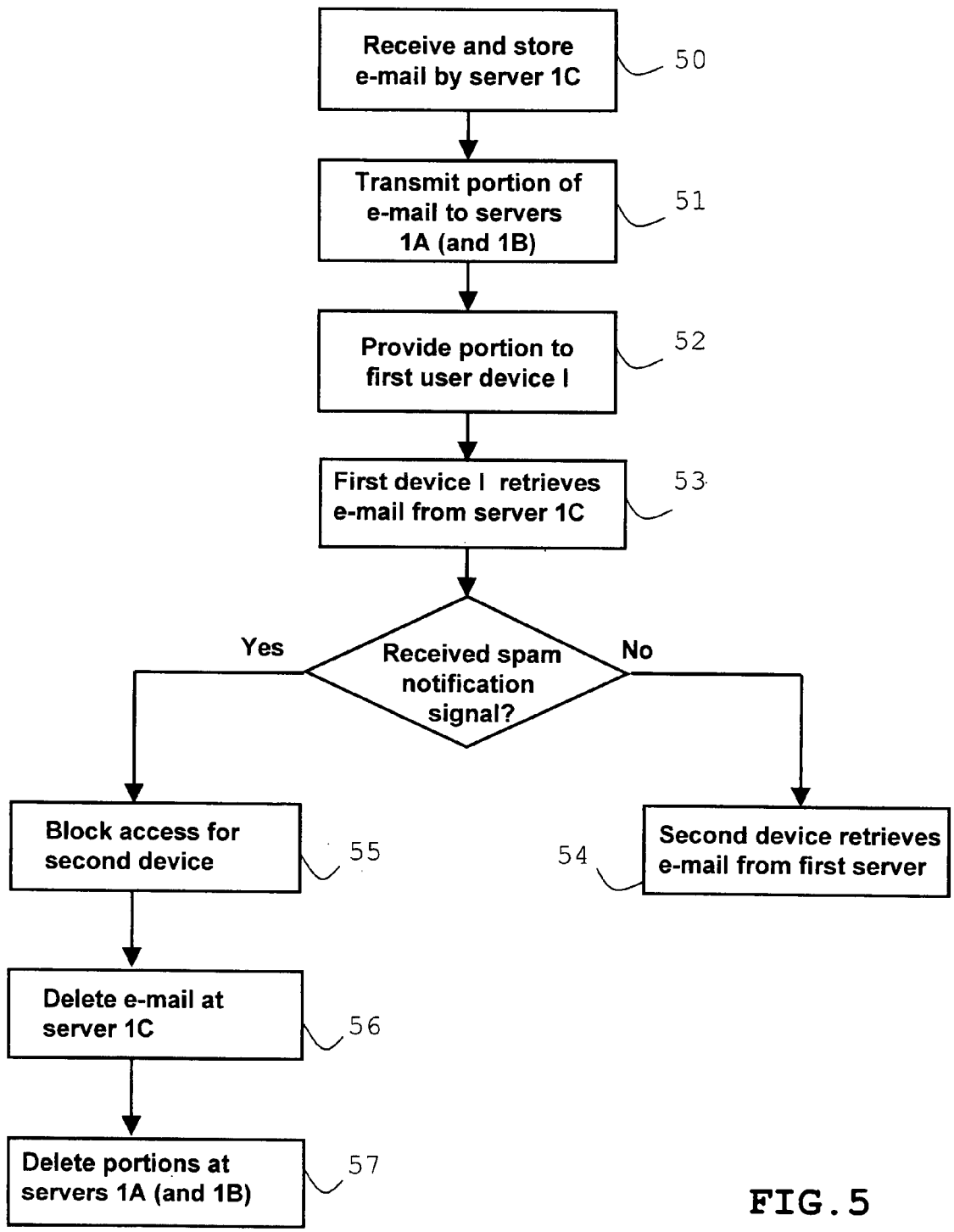
FIG. 5 shows a flow chart depicting steps of a method for reducing the proliferation of electronic messages for the communication system of FIG. 4.

An embodiment of the operation of the system in accordance with FIG. 4 will now be described with reference to FIG. 5.

The user of the third user device III sends an electronic spam message to the server system 1 with the users of user devices I and II as addressees.

The electronic message receiver 13 of server 1C receives the electronic spam message, possibly divided in fields, and stores the message/fields in the memory 11 in step 50 in a manner further described with reference to FIG. 6. Briefly, instead of storing the electronic message in a conventional e-mail server, individual parts (fields) of the electronic message are stored separately in fields of a database model.

In step 51, the electronic message provider 14 of the third server 1C assembles an electronic message portion with characteristics of the original electronic message. A portion of an electronic message may e.g. comprise one or more fields of the electronic message or a new portion assembled on the basis of characteristics of the electronic message. As an example, the portion of the electronic message contains a sender-field, a subject-field, a retrieval key for retrieving the complete electronic message and possibly a date. The data size of the portion of the electronic message may be less than 200 bytes. A portion provider of the electronic message provider 14 transmits the portion of the electronic message to the first server 1A and the second server 1B using the inner ring of the server system 1. Instead of pushing the portion of the electronic message from the third server 1C to the first and second servers 1A, 1B, the first server 1A may query the portion of the electronic message from the third server 1C upon receiving the request from the first user device I to open the mailbox. Reference is made to the international patent application ("Method and system for transmitting an electronic message") from the same applicant and filed on the same date as the present application, the contents of the international application be incorporated in the present application by reference in its entirety. This latter alternative provides the advantage that even the small portions of the electronic message are only transferred if necessary. The complete electronic message is stored only at server 1C.

Again, it is assumed that the user of the first user device I first opens his mailbox. By doing so, the first server 1A provides the portion of the electronic message to the first user device I in step 52. The electronic message itself may be retrieved in step 53 by the first user device I from the third server 1C over the connections 41 forming the outer ring by selecting the portion of the electronic message provided from the first server 1A.

If the user of the first user device I does not qualify the electronic message as spam, the user of the second device II may access the electronic message as well, e.g. by downloading the electronic message from the third server 1C (step 54).

If the user of the first user device I qualifies the contents of the electronic message as spam, he may transmit a spam notification signal relating to the electronic spam message to the server system 1. The user of the first user device I may e.g. send a spam notification signal by activating a dedicated button on a user interface of the first user device I. The spam notification signal is detected by the spam notification signal receiver 15 of the server 1C. In response to receiving the spam notification signal, the access restrictor 16 of the server 1C restricts access for (a user of) the second user device II to the electronic message, indicated by step 55. The e-mail deleter 19 of the server 1C may e.g. delete the portion of the electronic spam message at the second server 1B, such that the user of the second device II has no access to the electronic spam message at the third server 1C. Moreover, the e-mail deleter 19 may delete the electronic spam message itself from the memory 11 of the third server 1C as well as the portion of the electronic message from the first server 1A. These measures are indicated at steps 56 and 57. The deletion of the (portion(s) of) the electronic message is instructed over the inner ring of FIG. 4.

As mentioned above, the server system 1 stores only a single copy of the electronic message (at server 1C) independent of the number of addressees. The addressees are notified of the electronic message by means of portions characterizing the electronic message of small size. This saves a large amount of resources. However, the server system 1 may provide multiple copies of the electronic message if such an approach proves to be more effective. The number of copies of the electronic message is less than the number of addressees of said electronic message.

As for the embodiment of FIGS. 1 and 3, the user of the third user device III distributing the electronic spam message may be known to the server system 1, e.g. by having stored in register 17 of the third server 1C a unique login code comprising a user address and a user specific password required for accessing the server system 1. Using these data, the sender identification storage 20 has stored the identity of the sender of the electronic spam message. If an other electronic message is sent or has been sent (not necessarily an electronic spam message), it is determined that for this sender a previous spam notification signal has already been received. Access to these other messages of the sender may therefore be denied for the users of both devices I and II. Consequently, neither the first user device I nor the second user device II will have access to these other electronic messages. As such a measure may be rather harsh on the sender of the previous electronic spam message, consequences may be mitigated by allowing the access restrictor 16 at the third server 1C to restrict access for the (user of the) second user device II for a particular time period and/or to only a part of the other electronic messages. In particular, a communication history for the sender may be used for determining the consequences.

It should be appreciated that the register 17 may be shared by multiple servers 1A, 1B and 1C, as well as the sender identification storage 20 for senders of previous electronic spam messages.

Also, as previously described for the embodiment of FIGS. 1 and 3, the server system 1 may be triggered, using the spam notification signal, to block access for the user of the third user device to the server system 1 (including the milder variants) or the send a warning message.

Again, it should be appreciated that, while in the above example a single spam notification signal was sufficient to exclude other addressees from receiving (other) electronic messages and to exclude a sender from participation in the system, another number of spam notification signals may be set before such consequences will apply.

The servers 1A, 1B and 1C of the server system 1 are preferably not conventional e-mail servers. Such e-mail servers store e-mail messages, duplicate the e-mail messages to the number of addressees and provide the e-mail messages upon request for a particular one of those messages. The functionality of these mail servers is rather limited.

The applicant proposes to use one or more databases, such as Oracle® databases, for which the response can be programmed in dependence of e.g. the request made to the database. Incoming electronic messages are analyzed as or received in predetermined parts, which are stored in fields of the database(s). As an example, the header of a conventional e-mail is stored in separate fields, some of which are depicted in the data model of FIG. 6.

The methods as described above may be performed in a subscriber-only system, wherein the details of subscribers/ participants are known and wherein the subscribers have agreed to comply to particular general conditions. The members of the system have a place in the data model of FIG. 6.

Figure 6:
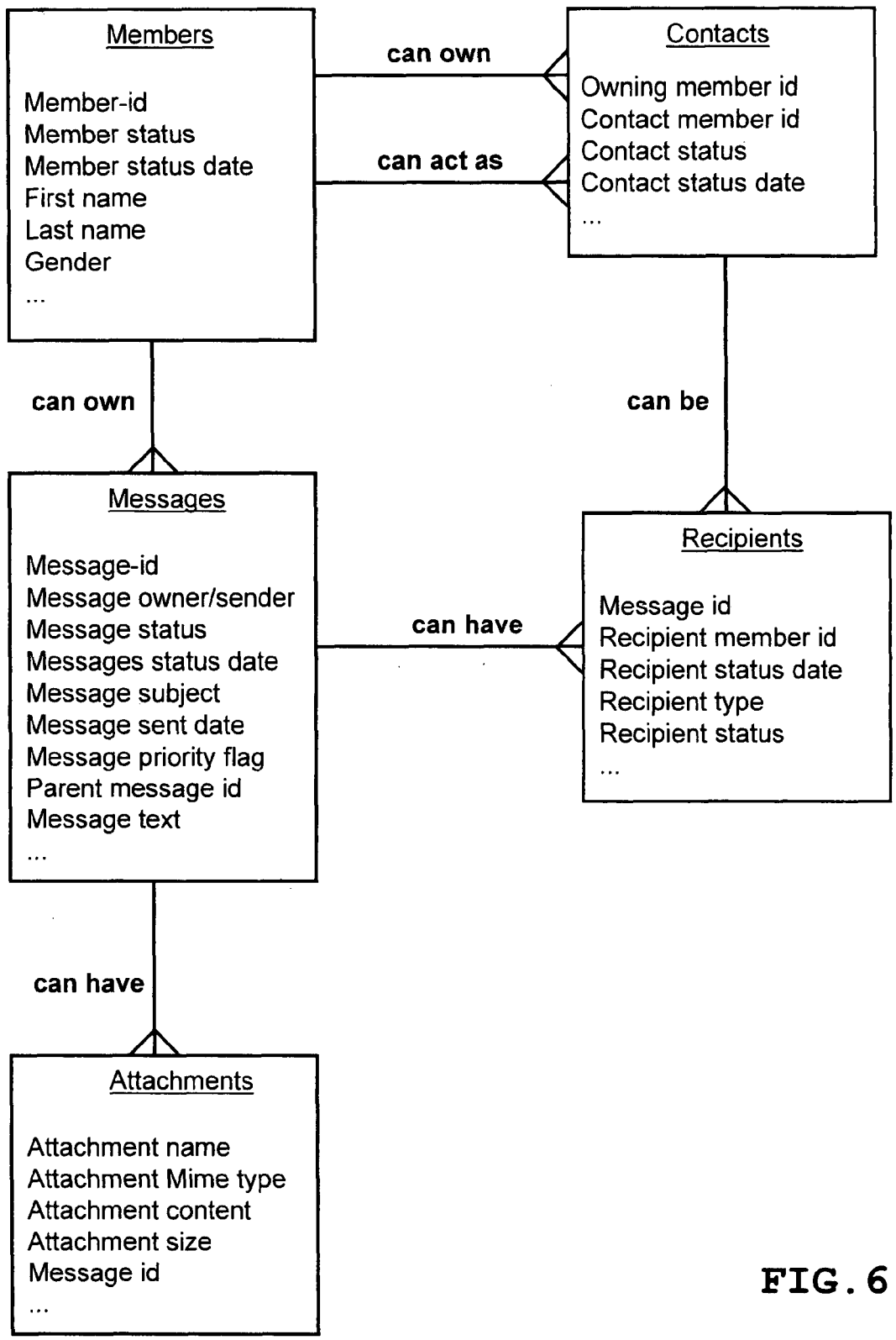
FIG. 6 shows an exemplary model for a database of a server of a server system according to an embodiment of the invention.

The use of databases for the servers 1A, 1B and 1C allows monitoring relations between different fields, as shown in FIG. 6.

The functionality as described above can be obtained using the database model of FIG. 6.

As an example, if a user issues a spam notification signal, the recipient status and recipient status date are updated. If a single spam notification signal is sufficient for restricting access to the electronic message for other recipients and to restrict access to the server system 1 for a sender, this status will propagate to the message status and the member status, respectively. By adding a messages status date and a member status data to the data model, flexibility is obtained.

Fields of the box "messages" may be part of the portion of the electronic message that is pushed or queried in the server system. Examples include the message owner/sender, the message subject and the message sent date. The message id relates to the retrieval key for retrieving the complete electronic message.

It should be noted that when a mandatory address book for addressing addressees of the electronic message is not used, the box "contacts" may be eliminated in the database model and a link can be established directly from the box "members" to the box "recipients".

The server system 1 may contain an approval module 25. it is noted that the below described operation of the approval module may be applied independently of the method described above, in particular with respect to the spam notification signal. As such, the server system 1 may be so configured for all the participants that any and all information addressed to them as participants cannot reach them and that, prior to the first communication within the system between two participants A and B, the two participants A and B will first have to go through an arrangement/approval protocol.

If A requests the server system 1 to enable communication with B, and B does not request the server system 1 to enable communication with A within a predetermined period, for example 1 day or 2 weeks, counting from the moment A made the request, the server system 1 will regard and register the communication as possibly unwanted for B and break off the arrangement protocol.

Also, the server system 1 may be configured so that if a participant A, who requests the server system 1 one or more times, for example 3 times or 10 times, within a predetermined period, for example 1 day or 2 weeks, to enable communication with one or more participants B, C, etc, and if one or more participants B, C, etc do not request the server to enable communication with A within said period, said participant A might be regarded as a potential source of spreading unwanted information, and that thus, and on the basis of registration by the server system 1 of one-sided communication requests from A, said requests from participant A may be subjected to a closer examination by the administrator, wherein the administrator has a possibility to terminate A's connection, for example, if A appears to have evil intentions, such as the sending of electronic spam messages.

The server system 1 may be configured so that A and B individually have a possibility to configure the server system 1 to enable them to address information to each other and/or download each other via the system once only, or for a specific period of time.

The server system 1 may be configured such that that if a participant A repeatedly, for example twice, addresses information to another participant B, C, etc in the system within a predetermined period, for example 1 day or 2 weeks, and the communication arrangements made between A and the other participant B, C, etc allow this, and a number of participants, for example one or more participants B, C etc limit the arrangements made with A within the fixed period to such an extent that they cannot download information originating from A any more, the administrator will detect and regard participant A as a potential source of unwanted communication, in which case the communication requests from said participant A can be subjected to a closer examination by the administrator, with the administrator having a possibility to terminate A's connection, for example, if A appears to have evil intentions, such as the sending of spam.

The server system 1 may be configured so that if one or more participants B, C etc limit the arrangements made with regard to a participant A for a specific period, for example 1 day or 2 weeks, to such an extent that B, C etc cannot download information addressed by A any more, participant A will be detected by the server system 1 and may be regarded as a potential source of unwanted communication by the administrator, whereupon the administrator can exclude participant A as an unwanted participant.

The server system 1 may also be configured so that a participant A cannot address a box number other than one of the box numbers whose owners have allowed participant A to send them information.

The approval module 25 in its variants may be applied in combination with a mandatory address book for addressing addressees of an electronic message.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:

1. A method performed by a server system comprising:
   receiving an electronic message using a computer processor of the server system from a sender of the electronic message;
   providing the electronic message or a portion thereof to a first user device of a first addressee of the electronic message;
   receiving, using the computer processor, at least one spam notification signal related to the electronic message or the portion thereof from the first user device, said at least one spam notification signal being sent in response to the first addressee activating a dedicated part of a user interface of the first user device, and
   preventing downloading or displaying from the server system of the electronic message or the portion thereof to a second user device of a second addressee of the electronic message in response to receiving the at least one spam notification signal from the first user device.

2. The method according to claim 1, wherein receiving the electronic message comprises receiving the electronic message from a third user device of the sender and wherein the first addressee, the second addressee, and the sender of said first, second and third user devices, respectively, are centrally registered.

3. The method according to claim 2, wherein each of said the first addressee, the second addressee, and the sender is provided with a unique login code comprising a user address and a user-specific password for accessing the server system.

4. The method according to claim 1, further comprising receiving and transmitting said electronic message in a secured manner.

5. The method according to claim 1, wherein the server system comprises at least a first server and a second server, wherein receiving the electronic method comprises receiving the electronic message at the first server, and the method further comprising:
   storing the electronic message at the first server
   transmitting a portion of the electronic message to the second server;
   receiving the portion of the electronic message at the second server;
   providing the portion of the electronic message from the second server to the first user device; and
   providing the electronic message from the first server to the first user device in response to selecting the portion of the electronic message.

6. The method according to claim 5, wherein receiving the at least one spam notification signal comprises receiving the at least one spam notification signal at the first server.

7. The method according to claim 5, further comprising providing a plurality of copies of the electronic message, wherein a number of copies of the electronic message is less than a number of addressees of the electronic message.

8. The method according to claim 5, wherein storing the electronic message comprises storing the electronic message only once at the first server.

9. The method according to claim 6, further comprising deleting the electronic message at the first server and/or the portion of the electronic message at the second server in response to the spam notification signal.

10. The method according to claim 1, further comprising using a computer processor for:
    storing a sender identification of a sender of the electronic message for which the spam notification signal was received;
    receiving or having received one or more other electronic messages from the sender;
    restricting access to at least one of the other electronic messages for at least one of the first user device and the second user device using the sender identification.

11. The method according to claim 10, wherein restricting access to the at least one of the other electronic messages includes at least one of:
    restricting access to the other electronic messages for a particular time period;
    restricting access to a part of the other electronic messages; and restricting access to the other electronic messages for one or more addressees of the other electronic messages in dependence on a communication history between the sender and the one or more addressees of the other electronic messages.

12. The method according to claim 11, wherein the time period or the part is determined by at least one of the following:
a number of spam notification signals received for electronic messages of the sender;
a number of times access has been restricted for electronic messages of the sender.

13. The method according to claim 1, further comprising transmitting a warning message to a sender of the electronic message for which the spam notification signal was received.

14. The method according to claim 1, further comprising restricting access to the server system for the sender of the electronic message for which the spam notification signal was received.

15. The method according to claim 14, wherein restricting access is dependent on at least one of the following:
a number of spam notification signals received for electronic messages of the sender;
a number of times access has been restricted for electronic messages of the sender; and
a communication history between the sender and one or more addressees of the electronic message.

16. The method according to claim 1, wherein the method is performed independently from operation of a spam filter, the spam filter using a spam rule set to detect electronic spam messages received by the system.

17. The method according to claim 1, and further comprising allowing an electronic exchange between a sender and an addressee only if both the sender and the addressee have signaled approval for the exchange to the access module in advance.

18. A non-transitory computer readable medium comprising software code portions adapted for, when installed in and executed by a computer processor of a server system, performing a method comprising:
receiving an electronic message using the computer processor from a sender of the electronic message;
providing the electronic message or a portion thereof to a first user device of a first addressee of the electronic message;
receiving, using the computer processor, at least one spam notification signal related to the electronic message or the portion thereof from the first user device, said at least one spam notification signal being sent in response to the first addressee activating a dedicated part of a user interface of the first user device, and
preventing downloading or displaying from the server system of the electronic message or the portion thereof to a second user device of a second addressee of the electronic message in response to receiving the at least one spam notification signal from the first user device.

19. A server system comprising:
one or more processors;
memory accessible by the one or more processors and configured for storing software code portions that, when executed by the one or more processors:
receive an electronic message, using the one or more processors, from a sender of the electronic message;
provide the electronic message or the portion thereof to a first user device of a first addressee of the electronic message;
receive, using the one or more processors, at least one spam notification signal related to the electronic message or the portion thereof from the first user device, said at least one spam notification signal being sent in response to the first addressee activating a dedicated part of a user interface of the first user device; and
prevent downloading or displaying of the electronic message from the server system to a second user device of a second addressee of the electronic message in response to receiving the at least one spam notification signal from the first user device.

20. The server system according to claim 19, wherein one of the software code portions, when executed by the one or more processors, stores a unique login code comprising a user address and a user specific password required for accessing the server system.

21. The server system according to claim 19, wherein one of the software code portions, when executed by the one or more processors, receives the electronic message from a third user device of the sender and secures communication between the server system and the first, second and third user devices.

22. The server system according to claim 19, wherein said server system comprises at least a first server and a second server, wherein the first server comprises:
a first processor of the one or more processors; and
first memory of the memory, the first memory accessible by the first processor and configured for storing software code portions that, when executed by the first processor
receive the electronic message;
store the electronic message;
obtain a portion of the electronic message;
transmit the portion of the electronic message to the second server, and
transmit the electronic message to the first user device in response to receiving a request for the electronic message from the first user device;
and the second server comprises:
a second processor of the one or more processors; and
second memory of the memory, the second memory accessible by the second processor and configured for storing software code portions that, when executed by the second processor
receive the portion of the electronic message from the first server; and
provide the first user device with the portion of the electronic message.

23. The server system according to claim 22, wherein one of the software code portions of the first server, when executed by the first processor, receive the at least one spam notification signal from the first user device.

24. The server system according to claim 19, wherein one of the software code portions, when executed by the one or more processors, generate a plurality of copies of the electronic message, wherein a number of copies of the electronic message is less than a number of addressees of the electronic message.

25. The server system according to claim 22, wherein only the first memory of the first server stores the electronic message.

26. The server system according to claim 22, wherein one of the software code portions, when executed by the one or more processors, delete the electronic message at the first server and the electronic message portion at the second server in response to the spam notification signal.

27. The server system according to claim 19, wherein one of the software code portions, when executed by the one or more processors, stores a sender identification of a sender of the electronic message for which the spam notification signal was received, receives at least one other electronic message and restricts access to the at least one other electronic message for at least one of the first user device the said second user device using the sender identification.

28. The server system according to claim 27, wherein one of the software code portions, when executed by the one or more processors, is further adapted to perform at least one of:
- restricting access to the at least one other electronic message for a particular time period;
- restricting access to a part of the at least one other electronic message; and
- restricting access to the at least one other electronic message for an addressee of the at least one other electronic message in dependence on a communication history between the sender and the addressee of the at least one other electronic message.

29. The server system according to claim 28, wherein one of the software code portions, when executed by the one or more processors, is further adapted to perform at least one of:
- counting a number of spam notification signals received for electronic messages of the sender, and
- counting a number of times access has been restricted for electronic messages of the sender.

30. The server system according to claim 19, wherein one of the software code portions, when executed by the one or more processors, sends a warning message to the sender of the electronic message for which the spam notification signal was received.

31. The server system according to claim 19, wherein one of the software code portions, when executed by the one or more processors, restricts access to the server system for the sender of the electronic message for which the spam notification signal was received.

32. The server system according to claim 31, wherein one of the software code portions, when executed by the one or more processors, restricts access to the server system in dependence on at least one of the following:
- a number of spam notification signals received for electronic messages of the sender;
- a number of times access has been restricted for electronic messages of the sender; and
- a communication history between the sender and one or more addressees of the electronic message.

33. The server system according to claim 19, and further comprising a spam filter using a spam rule set for detecting an electronic spam message, and wherein the software code portions, when executed by the one or more processors, operates independently from the spam filter.

34. The server system according to claim 19, wherein one of the software code portions, when executed by the one or more processors, allows an electronic exchange between a sender and an addressee only if both the sender and the addressee have signaled approval for the exchange to the access module in advance.

35. The server system according to claim 22, wherein at least one of the first and second servers comprises a programmable database.

36. The server system according to claim 19 and further including the first user device and the second user device.

* * * * *